March 16, 1954 L. TALALAY 2,671,931
APPARATUS FOR MOLDING SPONGE RUBBER ARTICLES
Filed Aug. 23, 1950 2 Sheets-Sheet 1
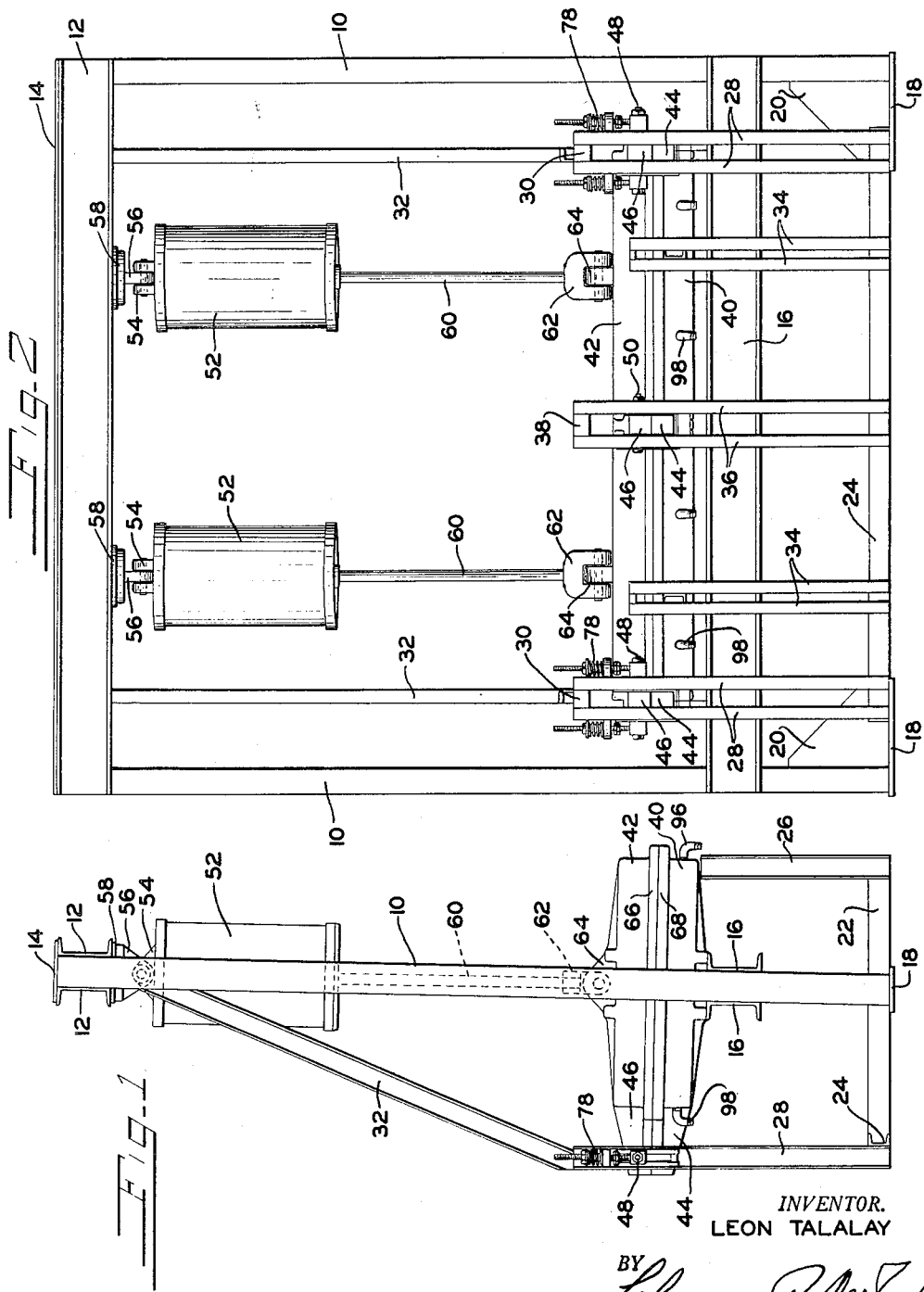
INVENTOR.
LEON TALALAY
BY Clarence R. Desjardins
HIS ATTORNEY

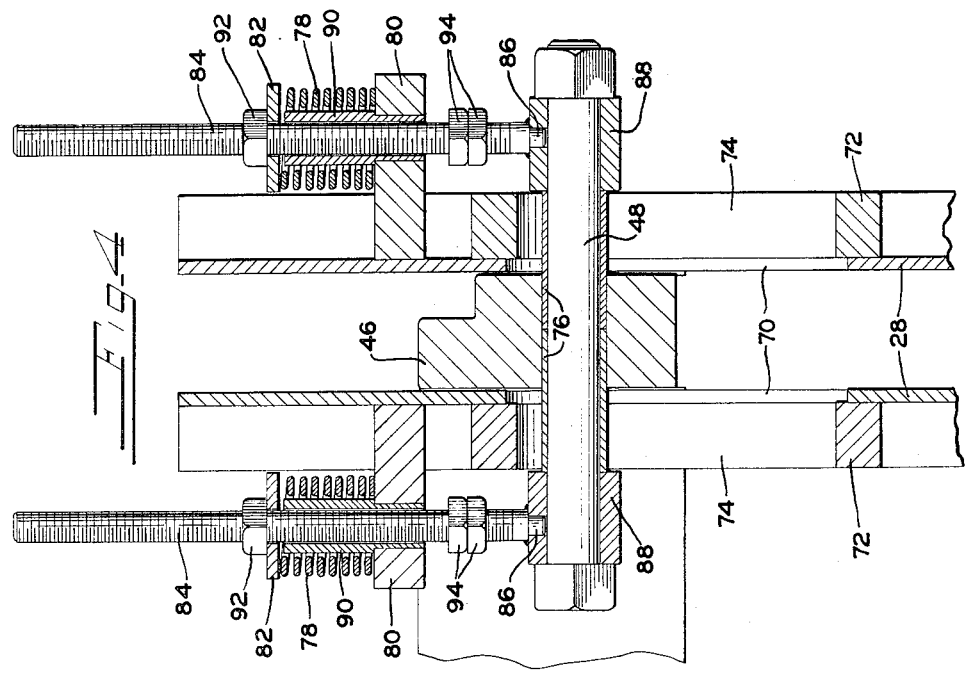
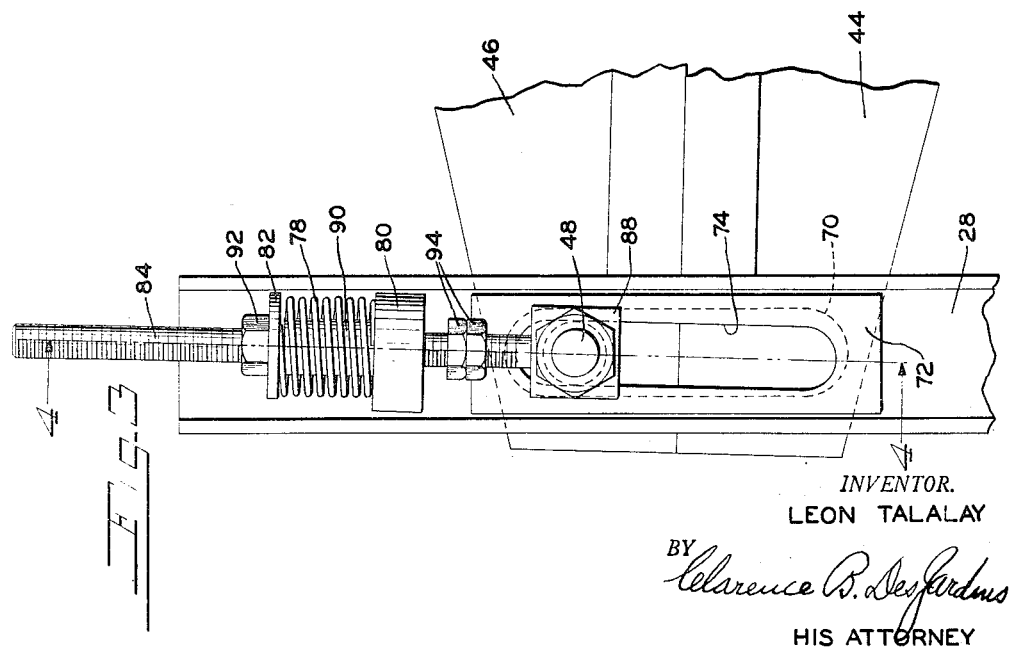
INVENTOR.
LEON TALALAY
BY Clarence B. Desjardins
HIS ATTORNEY Patented Mar. 16, 1954

2,671,931

UNITED STATES PATENT OFFICE 2,671,931

APPARATUS FOR MOLDING SPONGE RUBBER ARTICLES

Leon Talalay, Shelton, Conn., assignor, by direct and mesne assignments, of one-half to The Sponge Rubber Products Company, Shelton, Conn., a corporation of Connecticut and one-half to The Dayton Rubber Company, Dayton, Ohio, a corporation of Ohio Application August 23, 1950, Serial No. 180,997

15 Claims. (Cl. 18—17)

This invention relates to apparatus for manufacturing articles such as cushions, mattresses, and the like, of sponge rubber or rubber-like material, and, more particularly, to molds wherein foamed latex or like material may be shaped, coagulated and vulcanized so as to produce the article desired.

Articles of foam rubber are generally made by foaming aqueous rubber dispersions, introducing the resultant foam into a mold and effecting coagulation and vulcanization of the product while in the mold. In one method commonly used, a chemical coagulant is introduced prior to or during the formation of the foam and gelling of the foam occurs ofter the foam has been introduced into the mold. In another method commonly used, as described in the patent to Wolf No. 2,138,081, foaming is carried out by the decomposition of hydrogen peroxide which has been incorporated into the dispersion, the mixture being introduced into the mold prior to the completion of decomposition so that a substantial proportion of the foaming will occur within the mold. In the patent to Talalay No. 2,432,353, foaming is carried out by the use of hydrogen peroxide as in the Wolf patent, after which the foam is frozen within the mold and coagulated by introducing a fluid coagulant under pressure into the mold so that the intercommunicating cell structure of the frozen mass is permeated by the coagulant, after which vulcanization of the coagulated material is effected. The aqueous dispersions which are converted to foam rubber material may comprise either natural latex or aqueous dispersions of synthetic rubber-like material, such as butadiene-styrene copolymers, polychloroprenes, and other elastomeric materials commonly known in the prior art by the term "synthetic rubber."

In molding articles of foamed latex or similar material, special problems arise which are not encountered in the shaping of articles from ordinary rubber. One of the most troublesome problems arising in the manufacture of sponge rubber goods is that of venting the mold so as to permit any entrapped air or excess gas formed during the expansion of the foamed latex to escape therefrom. This is necessary in order to insure that the foam will completely "fill out" the mold and prevent the formation of cavities or blemishes on the surface of the product, or the creation of gas pockets within the interior of the article. Furthermore, during coagulation of frozen foam in the process described in the above-mentioned Talalay patent by introduction of a fluid coagulant, such as $CO_2$, it is desirable to provide means for releasing excess pressure. Various types of venting arrangements have been used with varying degrees of success. However, it is believed that the invention hereinafter to be disclosed provides a more suitable and more expeditious manner of venting molds of this character than any of the various expedients heretofore employed.

In accordance with the present invention, a two-part leaf mold is supported in the framework of the molding apparatus in such a manner that when the pressure within the mold exceeds a certain maximum value, the sections of the mold will be permitted to separate slightly so as to permit any entrapped air or gas to escape from between the flanges of the mold. In the embodiment of the invention to be hereinafter shown and described, the means for pivotally supportnig the upper section of the mold is arranged for limited sliding movement in a substantially vertical direction, and is urged upwardly by a spring which balances out a portion of the weight of the upper section. In this way, the pressure required within the mold in order to lift the rear end thereof may be reduced to any desired degree by varying the force exerted by the spring. Means is also provided whereby the upward thrust provided by the spring may be adjusted by the operator of the molding apparatus so as to fix the pressure at which the upper section will be lifted by the pressure of the gases within the mold.

In this manner, there is provided a simple but effective means for venting molds of this character. Also, with this type of venting arrangement, a moderate pressure may be maintained within the mold as is desirable in molding articles of foamed latex. However, the mold will be automatically vented in the event that the internal pressure exceeds this predetermined value.

Accordingly, it is an object of this invention to provide a molding apparatus for shaping articles produced from foamed latex and other similar foamed material where a simple and effective means is provided for venting the mold of entrapped air or gas.

Another object of the invention is to provide a novel form of hinge construction for leaf-type molds.

Another object of the invention is to provide a molding apparatus which is so constructed as to permit the upper section of a two-part mold to be lifted slightly when the pressure within the mold exceeds a certain maximum value, whereupon the entrapped gases may escape from between the flanges of the mold.

Another object of the invention is to provide an apparatus of the type described in the preceding object in which the maximum value to which the pressure must rise before the upper section is lifted may be varied within certain limits.

Further objects of the invention will appear from the detailed description to follow. In this description there will be disclosed one particular form or embodiment of the invention which has been found to be well suited for the purpose of carrying out the invention. However, it is to be understood, of course, that the invention may also be practiced with equally satisfactory results through the use of constructions which differ somewhat from that shown herein. The particular modification chosen for illustrating the present invention is shown in the accompanying drawings, forming a part of this specification, in which:

Fig. 1 is a side elevation of a molding apparatus embodying the present invention.

Fig. 2 is a rear view of the apparatus shown in Fig. 1.

Fig. 3 is a fragmentary end view showing the specific manner in which the sliding pivot joint is constructed in this modification of the invention.

Fig. 4 is a cross-sectional view taken along the line 4—4 of Fig. 3 with parts removed.

In Figs. 1 and 2 of the drawings is shown a molding machine suitable for the production of sponge rubber articles on a large scale. As shown in these drawings, the machine is comprised of a frame which includes uprights 10 on the upper end of which are fastened header bars 12 and a cover plate 14. Also secured to the uprights 10, is a pair of mold support bars 16 which lie directly beneath the mold and serve to support the same in the machine. The lower end of each upright 10 rests upon, and is secured to, a base plate 18 to which is secured a gusset plate 20. The plate 20 is also secured to its associated upright 10 and serves to brace the same against sidewise movement as viewed in Fig. 2. Also secured to the inner ends of the gusset plates 20 and the base plates 18, is a pair of cross bars 22 (only one shown) which bars are connected with one another by a pair of stringers 24 (only one shown). At its forward end, each of the cross bars 22 is provided with an upright support bar 26, the upper end of which lies directly beneath the forward edge of the mold. As shown in Figs. 1 and 2, the rearmost stringer 24 has secured thereto two sets of spaced upright support bars 28 which are interconnected at their upper ends by means of spacer blocks 30. To each of the blocks 30 is secured the lower end of a diagonal brace 32, the upper end of which is secured to the forward header bar 12. As shown in Fig. 2, the rearmost stringer 24 also has secured thereto two pairs of intermediate upright supports 34 and a centrally located set of upright support bars 36. The bars 36 are similar to the bars 28, and, like these bars, are held in spaced relationship at their upper ends by means of a spacer block 38.

Mounted on the framework which has just been described, is a leaf-type mold comprised of a lower section 40 and an upper section 42. The lower section 40 of the mold is supported on the bars 16 and is also secured to the bars 28 and 36 by means of three supporting lugs 44. These lugs are formed integrally with the main body portion of lower section 40 and pass between the spaces provided between the bars 28 and 36 to which they may be fastened by any suitable means.

The upper section 42 of the mold normally rests directly on top of the lower section 40 and, like the lower section, is provided with three supporting lugs 46 which extend between the spaces provided between the bars 28 and 36. The two outermost lugs 46 are each apertured to receive hinge or pivot pins 48 which pass through slots provided in each of the bars 28. The center lug 46 is likewise apertured to receive a pivot pin 50 which passes through slots provided in the centrally located set of bars 36.

For the purpose of opening and closing the mold, i. e., raising and lowering the upper section 42 about the pins 48 and 50, there is provided a pair of air cylinders 52 each of which is provided at its upper end with a clevis 54. Each clevis is pivotally attached to a supporting bracket 56 which, in turn is fastened to a supporting plate 58 secured to the underside of the header bars 12. Each cylinder is provided with a piston rod 60 on the lower end of which is mounted a clevis 62 which is pinned to a lug 64 formed on the upper section 42 of the mold. Hence, by applying air under pressure to the lower ends of the cylinders 52, the piston rods 60 may be retracted within the cylinders so as to lift the upper section 42 and cause the mold to be opened. The finished sponge rubber article may then be removed from the mold and a fresh charge of foamed latex introduced therein preparatory to the formation of another sponge rubber article. The mold is thereafter closed by releasing the air from the bottoms of the cylinders so as to permit the section 42 to move downwardly under its own weight until a lip or flange 66 thereon comes into contact with a similar lip or flange 68 provided on the lower section 40. Sometimes the pressures developed within the mold are sufficient to counterbalance the weight of the upper mold section, and it then becomes necessary to also apply air pressure to the upper ends of the air cylinders to hold the mold closed during the molding operation.

Where a chemical foaming agent has been incorporated in the latex as in the Wolf patent referred to above, most of the foaming of the latex is carried out within the mold with resultant increase of pressure therein. Coagulation may then be effected by the action of chemical coagulants, such as sodium silicofluoride, incorporated in the dispersion, or by freezing followed by introduction of a fluid coagulant as described in the Talalay patent referred to above. Heat is then applied to the mold in order to vulcanize the rubber. After the rubber is vulcanized, air is supplied to the cylinders 52 for the purpose of lifting the upper section of the mold in order to enable the finished article to be removed and a new charge of foamed latex to be introduced.

As mentioned earlier herein, means is provided for permitting the rear edge of the upper section 42 to be lifted slightly whenever the internal pressure within the mold which is developed either during the expansion of the foamed latex, or during introduction of the fluid coagulant, or both, exceeds a certain value. For this purpose, the pins 48 and the pin 50 are free to move to a limited extent in a vertical direction by means of slots provided in the bars 28 and 36. The slots in the bars 28 are indicated by the reference numeral 70 in Figs. 3 and 4 and it is to be understood that similar slots are likewise provided in the bars 36. Covering the slots 70 are guide blocks 72 which may be fixedly attached to the bars 28 in any desired manner. Each block 72 is provided with an accurately machined slot 74 which serves to guide the pins 48 for movement in a substantially vertical direction. Similar blocks are secured to the bars 36 and these blocks are provided with slots corresponding to the slots 72 for the purpose of accurately guiding the pin 50 for movement in the same direction as the pins 48.

As best shown in Fig. 4, the pins 48 have bushings 76 mounted thereon, which bushings are machined for a sliding fit in the slots 74. The apertures in the lugs 46 are likewise machined to a diameter which is substantially equal to the outside diameter of the bushings 76. A similar construction is provided in the case of the pin 50 whereby the pins 48 and 50 will all be guided for substantially vertical movement within the support bars 28 and 36. Hence, the upper section 42 of the mold is supported in the framework of the machine for both pivotal movement about the axes of the pins 48 and 50 and also for limited translatory movement in a substantially vertical direction.

For the purpose of urging the rearward portion of the upper section 42 in an upward direction so as to counteract a portion of the weight of this section in the vicinity of the rear edge of the mold, compression springs 78 are provided, these springs being so arranged as to provide an upward thrust on the pins 48.

As shown in Figs. 3 and 4, the springs 78 are compressed between brackets 80 provided on the bars 28 and washers 82 mounted on threaded rods 84. The lower end of each rod has a tenon 86 formed thereon which is machined for a press fit in an aperture provided in a block 88 journaled on the bolt 48. If desired, the tenons 86 may be copper brazed to the blocks 88 so as to insure a permanent connection between the rods and the blocks.

Each rod 84 is guided for substantially vertical movement by means of a sleeve 90 mounted in the bracket 80. The springs 78 are compressed by means of nuts 92 which are screwed down on the rods 84 as shown in Figs. 3 and 4. By suitable adjustment of the nuts 92, the compression of the springs may be varied to thereby enable the upward thrust on the pins 48 to be adjusted to the desired value. For example, if it is desired that the rear edge of the upper section 42 of the mold shall be lifted when the pressure within the mold becomes greater than, say, 6–7 pounds per square inch, the nuts 92 may be suitably adjusted either up or down until a point is reached where a pressure within the mold slightly in excess of this pressure will cause the rear edge of the upper section 42 to lift slightly and permit venting of the mold. In this manner, a moderate pressure may be maintained within the mold while the foamed latex material therein is undergoing expansion, but any excessive pressures developed within the mold will cause the lips or flanges thereof to separate so as to relieve the pressure. Inlet nipples 96 (Fig. 1) (only one shown) are provided along the front edge of the lower section of the mold for the introduction of the fluid coagulant and outlet nipples 98 (Figs. 1 and 2) are provided at the back of the mold for removing excess fluid coagulant where the Talalay process is to be utilized. The mold is supported with a slight forward inclination to the horizontal since it has been found that tilting the mold forward in this manner will create a tendency for gaseous material to collect in the top rear portion of the mold from which it may be readily vented from vent openings either at the top or at the bottom rear portion of the mold, thus eliminating the possibility of forming gas pockets in the product. This inclination is usually less than ten degrees. It will be seen that there is thus provided a simple and effective means for venting molds of the type used in the manufacture of sponge rubber products and that this means may be conveniently adjusted so as to maintain a preselected pressure within the mold cavity before venting of the mold will take place.

As further shown in Figs. 3 and 4, this device may be provided with an adjustable limit stop so as to predetermine the amount of upward movement allowed the pins 48 and the rear edge of the upper mold section. For this purpose a pair of nuts 94 are positioned on each threaded rod 84 below the bracket 80. The upper nut may be adjusted on the rod 84 so as to provide the desired amount of clearance between this nut and the bracket 80, after which it may be locked in place by the lower nut of the pair. Thus, the upward travel of the pins 48 will be limited to an amount equal to the clearance thus provided and the amount of upward movement of the rear edge of the upper mold section 42 may be controlled as desired.

Having thus described my invention, what I claim as new and useful and desire to secure by United States Letters Patent, is:

1. A leaf-type mold adapted to permit automatic venting of gases trapped within the mold cavity comprising a frame, a lower mold section mounted in a substantially horizontal position on said frame, an upper mold section located above said lower section and adapted to rest thereon when the mold is closed, means on said upper section and said frame for limiting the movement of the latter section to rotation about an axis adjacent and parallel to the rear edge thereof and to translation in a substantially vertical direction, said upper section being free to move with respect to said lower section, during a molding operation, in response to excess gas pressure within the mold, and means for applying to said upper section along its axis of rotation an upwardly directed thrust which is smaller than the downward thrust resulting from the weight of said upper section so as to reduce the force with which the rear edge of the upper section bears against the corresponding edge of the lower section of the mold to a predetermined value when the mold is closed so that when the pressure of gases trapped within the mold cavity exceeds a given value, the upper section will be lifted slightly along its rear edge thereby permitting the trapped gases to escape from the mold.

2. The combination recited in claim 1 including means for applying a downward force on said upper section between the rear and forward edges thereof.

3. The combination recited in claim 2 wherein said force applying means includes a fluid pressure device.

4. A leaf-type mold adapted to permit automatic venting of gases trapped within the mold cavity comprising a frame, a lower mold section secured to said frame and having a sealing flange extending about its periphery, an upper mold section having a similar flange extending about its periphery, said upper section resting with its weight on said lower section and with its flange bearing against the flange of the lower section in the closed position of the mold so as to seal the mold against the escape of the foamed material contained therein, means for supporting said upper section on said frame for rotation about an axis adjacent to one edge thereof and also for translation either toward or away from said lower section, said upper section being free to move with respect to said lower section, during a molding operation, in response to excess gas pressure within the mold, and means acting on said upper section in the vicinity of said one edge for producing an upwardly directed thrust thereon, said thrust being smaller than the downward thrust resulting from the weight of said upper section, thereby reducing the downward pressure of the flange of the upper section on the flange of the lower section to a predetermined value when the mold is closed so that when the pressure of gases trapped within the mold cavity exceeds a given value, the upper section will be lifted slightly along said one edge thereby permitting the trapped gases to escape from the mold.

5. The combination recited in claim 4 wherein said supporting means includes a pivot pin and said reducing means includes a force exerting element acting on said pin.

6. The combination recited in claim 5 wherein said force exerting element comprises a spring.

7. The combination recited in claim 6 wherein means is provided for varying the force exerted by said spring on said supporting means.

8. The combination recited in claim 6 including means for limiting the range of action of said spring.

9. A leaf-type mold adapted to permit automatic venting of gases trapped within the mold cavity comprising a frame, a lower mold section secured to said frame, an upper mold section resting on said lower section in the closed position of the mold, a sliding pivot for fastening said upper section to said frame for rotation about its rear edge and for translation in a direction either toward or away from said lower section, said upper section being free to move with respect to said lower section, during a molding operation, in response to excess gas pressure within the mold, and means, including a spring, for applying to said pivot an upwardly directed thrust which is smaller than the downward thrust resulting from the weight of said upper section so as to offset a predetermined portion of the weight of said upper section in the vicinity of the rear edge of the mold when the mold is closed so that when the pressure of gases trapped within the mold cavity exceeds a given value, the upper section will be lifted slightly along its rear edge thereby permitting trapped gases to escape from the mold.

10. The combination recited in claim 9 including a fluid operated device for applying a downward force on said upper section approximately midway between the rear and forward edges thereof.

11. A leaf-type mold adapted to permit automatic venting of gases trapped within the mold cavity comprising a frame, a lower mold section fixedly attached to said frame and having a sealing lip extending about its periphery, an upper mold section having a similar lip extending about its periphery, said upper section, in the closed position thereof, resting on said lower section with its sealing lip bearing against the corresponding lip of the lower section so as to seal the mold against the escape of the foamed material contained therein, means, including a hinge pin attached to said upper section and a vertically extending slot in said frame for receiving and guiding said pin, so as to confine the movement of said upper section to rotation about one of its edges and to displacement in a vertical direction, said upper section being free to move with respect to said lower section, during a molding operation, in response to excess gas pressure within the mold, and means, including a spring, for applying to said pin an upwardly directed thrust which is smaller than the downward thrust resulting from the weight of said upper section so as to counteract a predetermined portion of the weight of said upper section and thereby reduce the sealing pressure on the lips in the vicinity of said one edge when the mold is closed so that when the pressure of gases trapped within the mold cavity exceeds a given value, the upper section will be lifted slightly along said one edge thereby permitting the trapped gases to escape from the mold.

12. The combination recited in claim 11 wherein the thrust applied by said last-named means is such as to cause the lips in the vicinity of said one edge to move apart whenever the pressure within the mold exceeds 5 to 10 pounds per square inch.

13. A leaf-type mold adapted to permit automatic venting of gases trapped within the mold cavity comprising a frame, a lower mold section supported on said frame at a slight inclination to the horizontal so that one edge of said section is slightly elevated with respect to the opposite edge thereof, an upper mold section adapted to rest on top of said lower mold section when the mold is closed, and means attached to the elevated edge of said upper mold section for supporting said upper section on said frame for rotation about an axis adjacent to said one edge of said lower section and also for translation either toward or away from said lower section, said upper section being free to move with respect to said lower section during a molding operation, in response to gas pressure within the mold, so as to release the gas accumulated in the elevated portion thereof.

14. A mold of the character recited in claim 13 including means cooperating with said supporting means for counteracting a predetermined portion of the weight of said upper section in the vicinity of said one edge so that when the pressure of gases trapped within the mold cavity exceeds the unbalanced weight of the upper mold section in the vicinity of said one edge, the upper mold section will be lifted slightly in the vicinity of said one edge thereby permitting the trapped gases to escape from the mold.

15. A leaf-type mold adapted to permit automatic venting of the gases trapped within the mold cavity comprising a frame, a lower mold section mounted on said frame at a slight inclination to the horizontal so that one edge of said section is slightly elevated with respect to the opposite edge thereof, said section being provided with a sealing flange extending about its periphery, an upper mold section having a flange extending about its periphery adapted to mate with the flange extending about the periphery of the lower section when the mold is closed so as to seal the mold against escape of the material contained therein, means for supporting said upper section on said frame for rotation about an axis adjacent to said one edge of said lower section and also for translation either toward or away from said lower section, said upper section being free to move with respect to said lower section, during a molding operation, in response to excess gas pressure within the mold, and means acting on said upper section in the vicinity of said one edge for reducing the downward pressure of the flange on the upper section against the flange on the lower section in the vicinity of said one edge by a predetermined amount so that when the pressure of gases trapped within the mold cavity exceeds the unbalanced, downward pressure of the upper section, the flanges of the mold will separate slightly and permit the gases trapped therein to escape from the mold.

LEON TALALAY.

References Cited in the file of this patent

UNITED STATES PATENTS

| Number | Name | Date |
|---|---|---|
| 2,231,254 | Cleveland | Feb. 11, 1941 |
| 2,238,530 | Lickteig | Apr. 15, 1941 |
| 2,255,770 | Glynn | Sept. 16, 1941 |
| 2,272,231 | Voth | Feb. 10, 1942 |
| 2,288,356 | Humphrey | June 30, 1942 |
| 2,315,770 | Cleveland | Apr. 6, 1943 |
| 2,420,411 | Blount | May 13, 1947 |
| 2,489,486 | Glynn | Nov. 29, 1949 |